(12) United States Patent
Nogas et al.

(10) Patent No.: US 6,351,535 B1
(45) Date of Patent: Feb. 26, 2002

(54) VARIABLE ANGLE MECHANISM FOR DESKTOP TELEPHONE

(75) Inventors: David Nogas, Ottawa; Michael Langlois, Calgary; Chris Gorman, Ottawa; Hans Beisner, Kemptville, all of (CA)

(73) Assignee: Mitel Corporation, Kanata (CA)

( * ) Notice: Subject to any disclaimer, the term of this patent is extended or adjusted under 35 U.S.C. 154(b) by 0 days.

(21) Appl. No.: 09/237,338

(22) Filed: Jan. 26, 1999

(30) Foreign Application Priority Data

Jan. 26, 1998 (GB) ................................................ 9801599

(51) Int. Cl.[7] .............................................. H04M 1/00
(52) U.S. Cl. ........................................ 379/436; 379/435
(58) Field of Search ................................ 379/428, 435, 379/436, 446, 455, 454

(56) References Cited

U.S. PATENT DOCUMENTS

| | | |
|---|---|---|
| 4,196,319 A | 4/1980 | Gates |
| 4,617,430 A | 10/1986 | Bryant |
| 5,568,548 A | 10/1996 | Repplinger et al. |
| 5,641,102 A | 6/1997 | Hellweg |
| 6,019,338 A * | 2/2000 | Brown et al. ................ 379/435 |
| 6,122,370 A * | 9/2000 | Westfall ...................... 379/435 |

FOREIGN PATENT DOCUMENTS

EP 773 657 A2 5/1997

* cited by examiner

*Primary Examiner*—Jack Chiang
(74) *Attorney, Agent, or Firm*—Keating & Bennett, LLP

(57) ABSTRACT

A telephone set includes a telephone component and a base component supporting the telephone component at a plurality of angles. The two components have nested curved portions allowing mutual angulation while maintaining the nested relation, thus allowing the telephone component to swing through a range of angulation with respect to the base component. The set includes a retention device for maintaining the portions in nested relationship, and a locking device for releasably securing the two components in any one of the plurality of mutual angulations.

9 Claims, 6 Drawing Sheets

VARIABLE ANGLE MECHANISM FOR DESKTOP TELEPHONE

This invention relates generally to desktop telephones, and has to do particularly with a mechanism permitting easy adjustment of the angle of incline of a telephone set.

BACKGROUND OF THE INVENTION

It is of advantage for a desktop telephone set to be easily adjustable in terms of the angle of incline with respect to a surface on which the telephone set rests. Particularly on telephones equipped with LCD's (liquid crystal display), the ability to vary the angle of the telephone helps to eliminate problems arising from glare, reflection and off-perpendicular viewing, which may obscure the display and reduce visibility. In the past, certain manufacturers provided a separate hinged am which fitted into different slots. Others provided a clip-on piece which could be attached in one of two positions on the base of the unit to provide a low-angle position and steep-angle position. In addition, separate bent wire support stands have also been available, typically having a single, fixed angulation.

It is clear from the above that there is a need for a telephone set incorporating a simple mechanism for angle adjustment, such that the need for extra parts or components is eliminated, the various angulated positions including a lowest or flat position allowing the telephone to be wall-mounted, and to be shipped in compact form.

These aims are attained by the combination, described below, of a telephone component and a base component for supporting the telephone component at a plurality of angles with respect to a surface on which the base component is placed, In a preferred embodiment, one of the components defines a concavely curved portion, while the other component defines a convexly curved portion adapted to nest within and be guided L)y the concavely curved portion such that, while the base component remains stationary, the telephone component can swing through a range of angulation with respect to the base component. Also provided are retention means for maintaining the portions in nested relationship while petting the telephone component to swing with respect the base component, and locking means for releasably securing the two components in any one of the plurality of mutual angulations;

BRIEF DESCRIPTION OF THE DRAWINGS

One embodiment of this invention is illustrated in the accompanying drawings in which like numerals denote like parts throughout the several views, and in which.

DETAILED DESCRIPTION OF THE DRAWINGS

Figure 11:
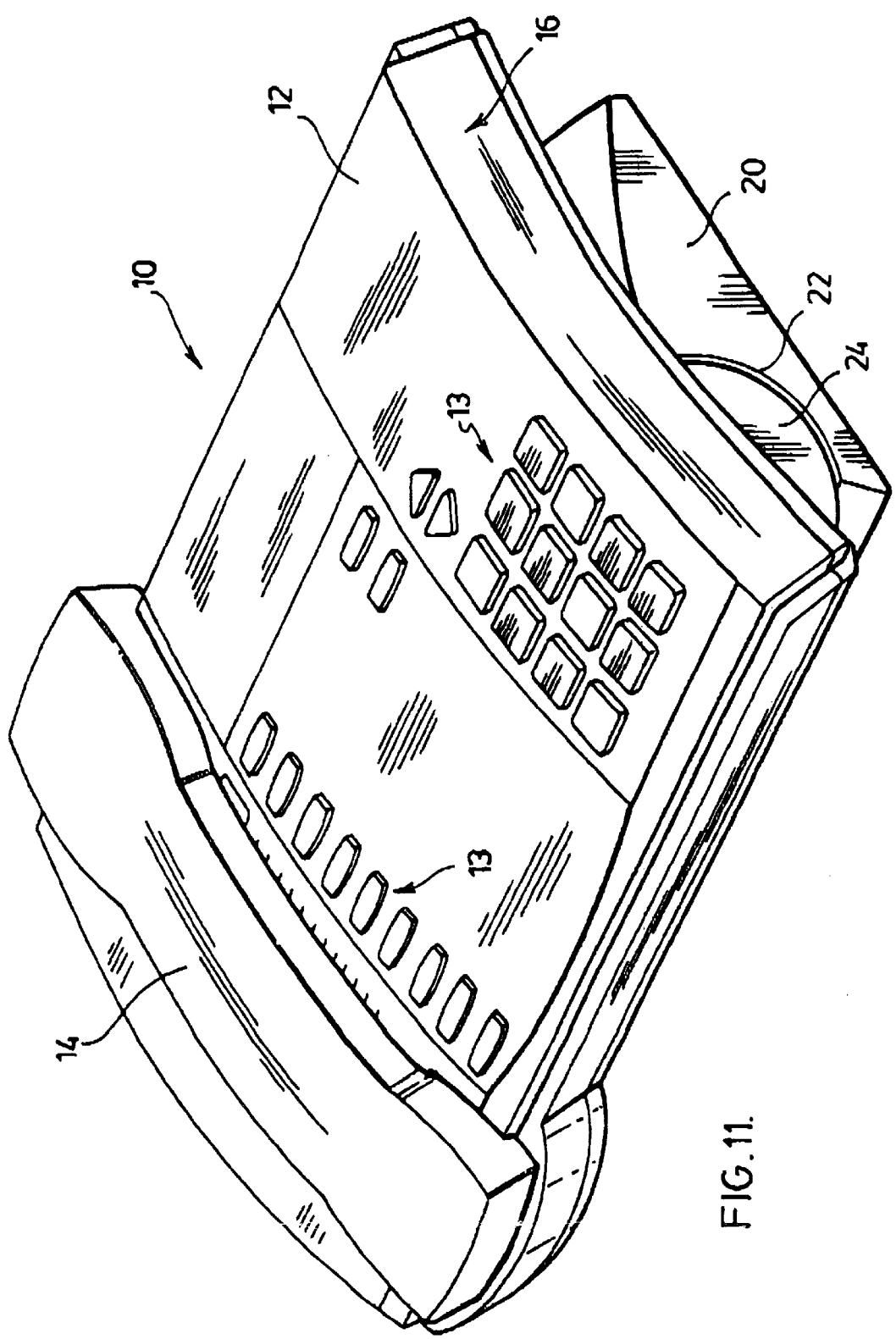
FIG. 11 is a perspective view of the complete telephone set, including the outer face.

Attention is first directed to FIG. 11, which shows a telephone set generally at 10, including a working surface 12 from which project various buttons or groups of buttons 13, and on which a conventional handset 14 removably lies.

The working surface 12 is a slightly outwardly convex surface defining the top wall of a housing 16, the bottom portion of which is provided by a telephone component 18. The telephone component is also identified in FIGS. 1, 2, 3 and 5. The other major part of the telephone set is a base component 20, seen in FIGS. 1, 2, 3, 5, 6, 7 and 8. The base component is also partially shown in FIGS. 9, 10 and 11.

Figure 8:
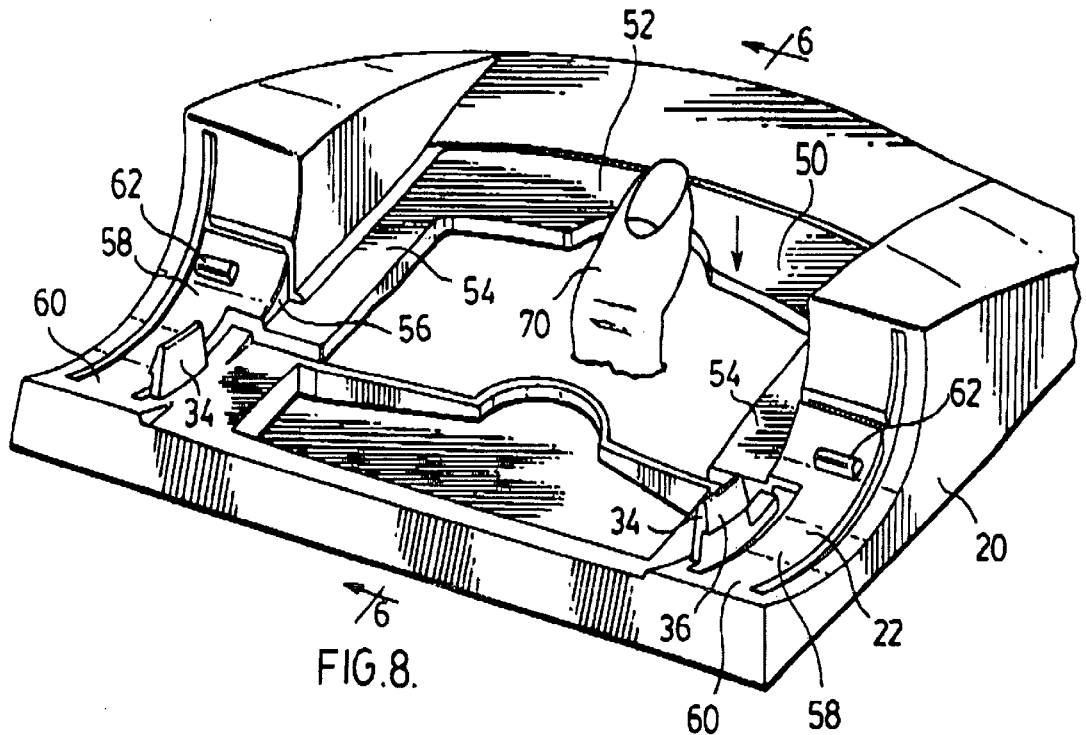
FIG. 8 is a perspective view of the base component of the telephone set.
Figure 9:
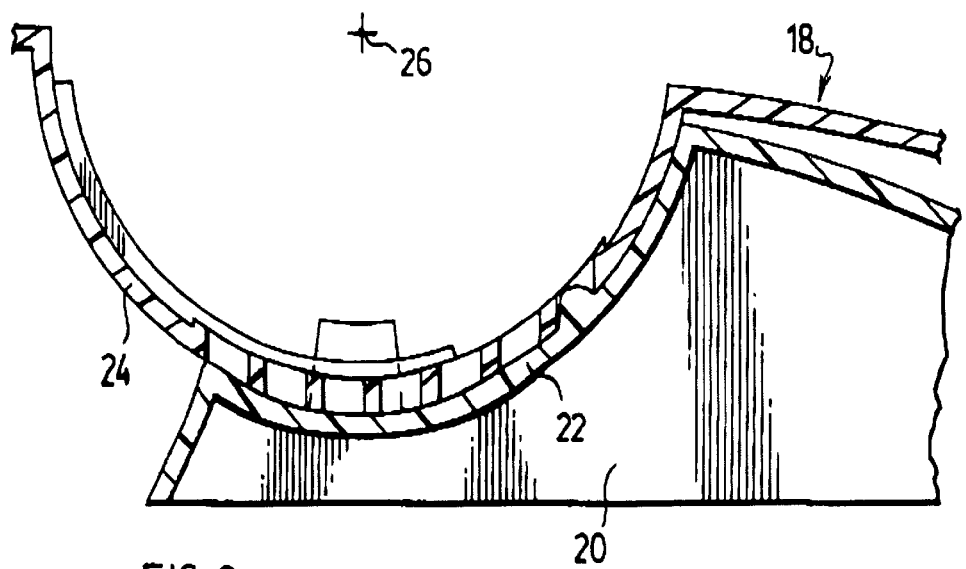
FIG. 9 s a cross-sectional view through two part-cylindrical portions on the respective main components, showing retention means and locking means, with the main components at one extremity of their mutual rotation.
Figure 10:
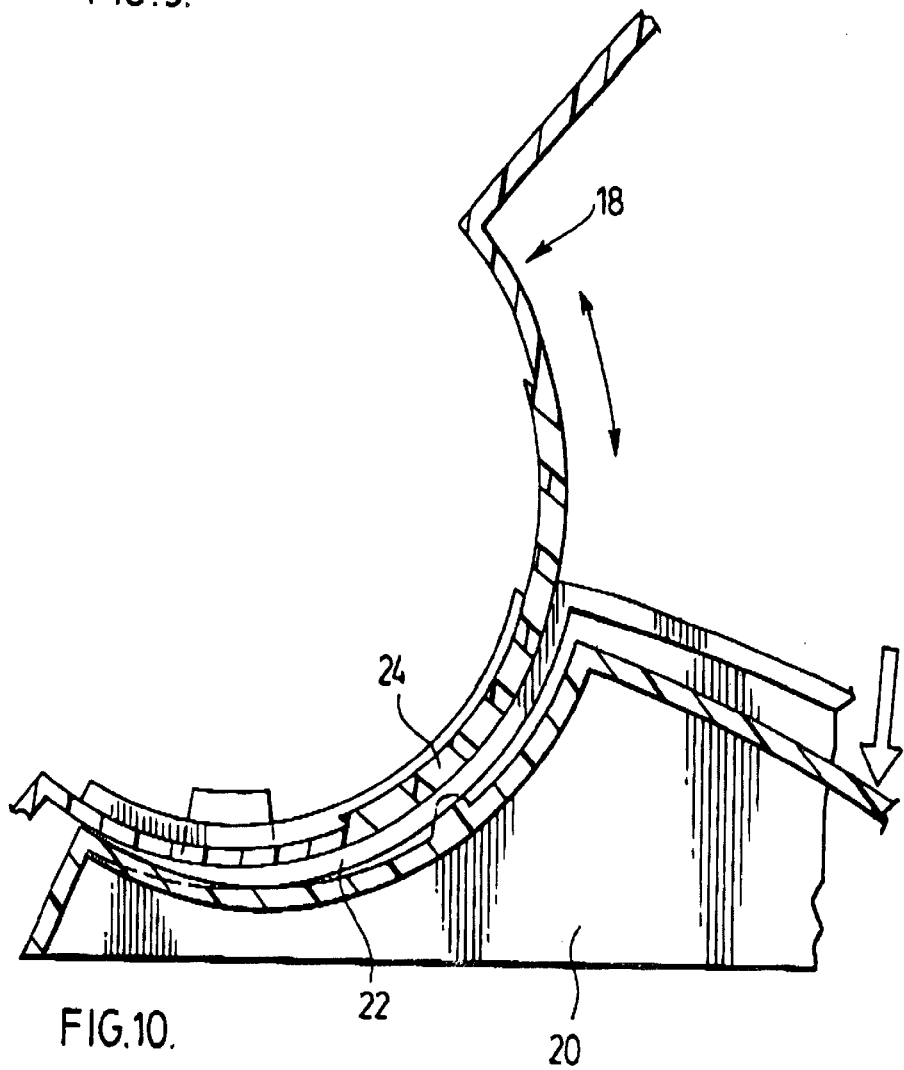
FIG. 10 is a view similar to FIG. 9, showing the components at close to the other extremity of mutual angulation.

With reference to FIGS. 3, 4, 6, 7, 8, 9 and 10, the base component 20 defines, at each forward corner, a concavely curved portion 22, while the telephone component defines corresponding convexly curved portions 24, as pictured in all of FIGS. 1 through 5, and also seen in section in FIGS. 9 and 10.

Figure 1:
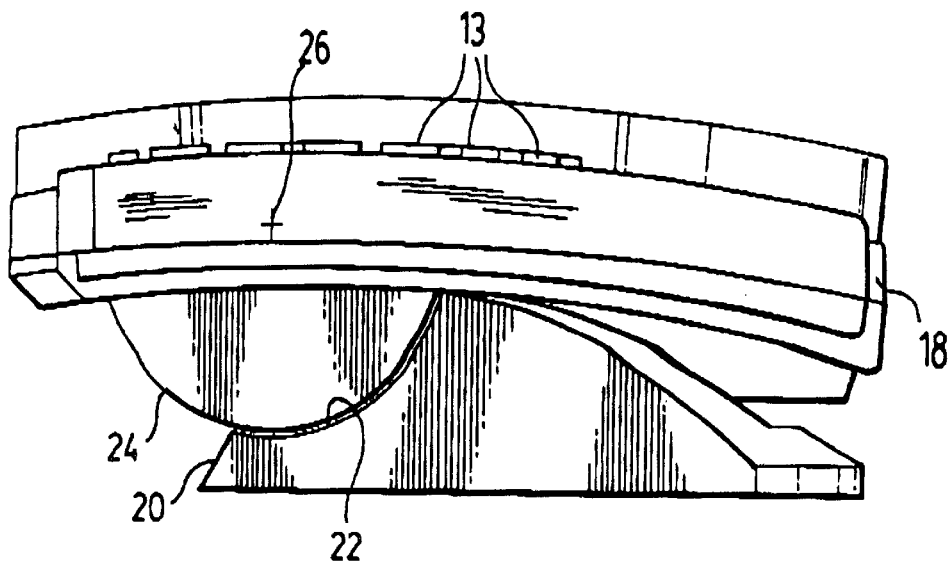
FIG. 1 is a side elevational view of a telephone set in accordance with this invention, in a "flat" condition.
Figure 2:
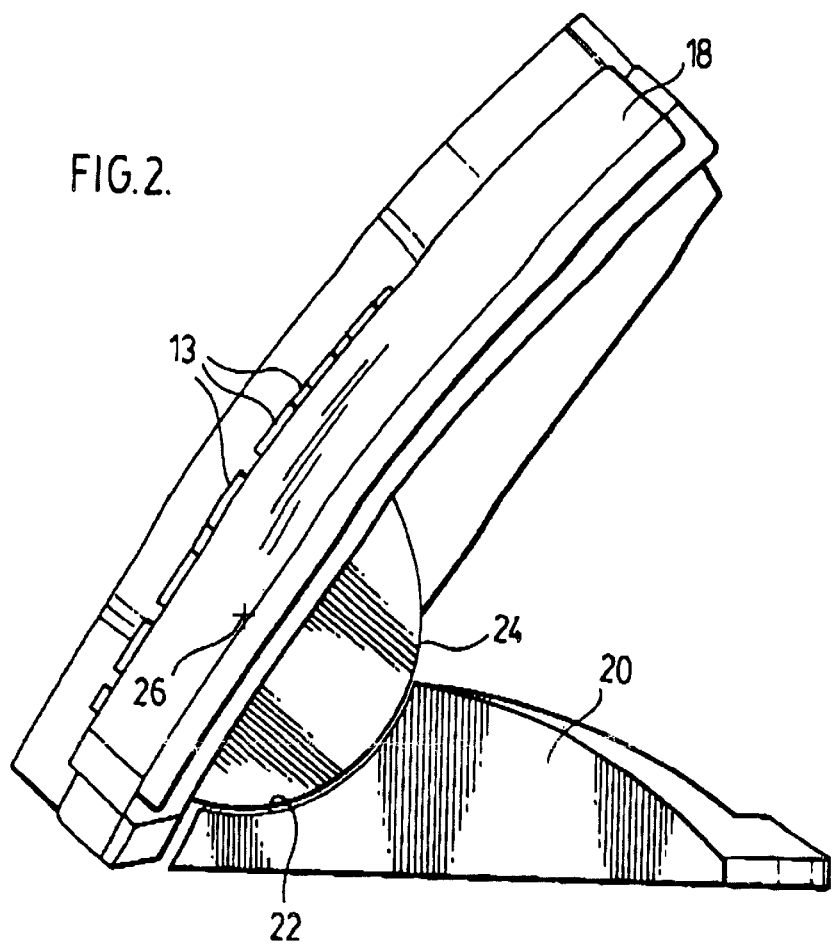
FIG. 2 is an end elevational view of the telephone set of FIG. 1, at close to its maximum angulation.

In the preferred embodiment, the concavely and convexly curved portions are both portions of a circular cylindrical surface. The portions 22 and 24 are adapted to nest together, with the convex portion 24 within and in contact with the convex portion 22. There is thus a hypothetical axis, marked 26 in FIG. 9, which is the center of curvature of the curved portions 22 and 24. The center of curvature 26 is also marked in FIG. 1, and represents the axis about which the telephone component 18 swings with respect to the base component 20. FIG. 2 shows the telephone set at close to the maximum angulation between the components 18 and 20. Thus, FIGS. 1 and 2 represent approximately the extremities of the range of angulation of the telephone component with respect to the base component.

Figure 3:
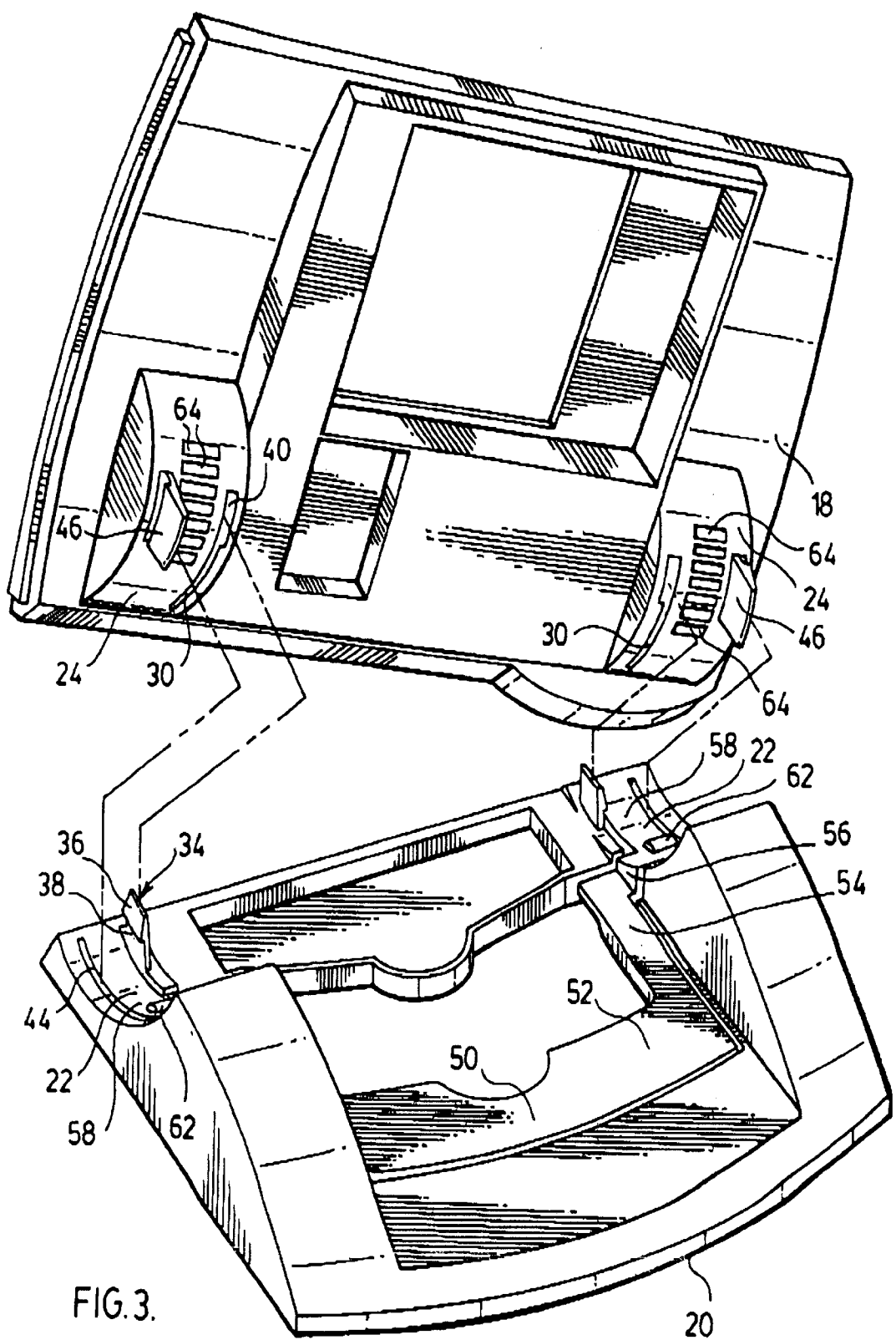
FIG. 3 is a perspective view of the two major components of the telephone set, such components being shown in spaced apart configuration, for the purpose of showing the interfittng portions thereof.
Figure 4:
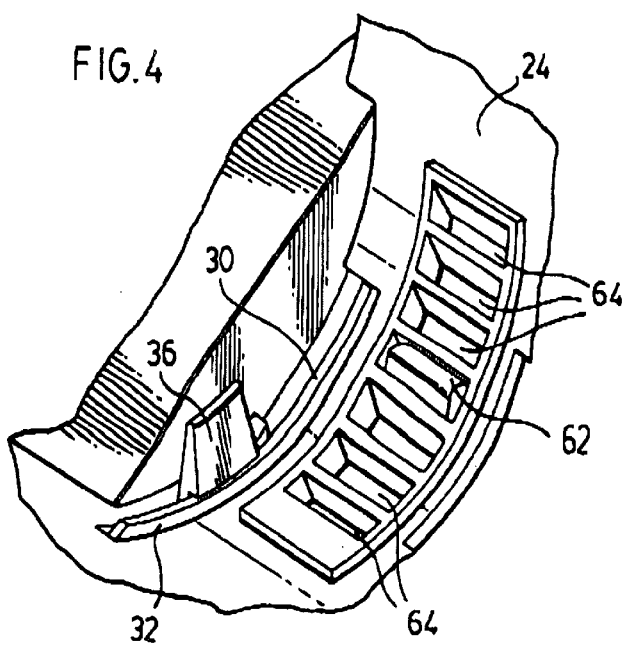
FIG. 4 is a partial perspective view of a guiding portion of the telephone component of the telephone set of this invention, showing operative portions of the base component interacting so as to achieve locked retention of the two components in assembled condition.
Figure 5:
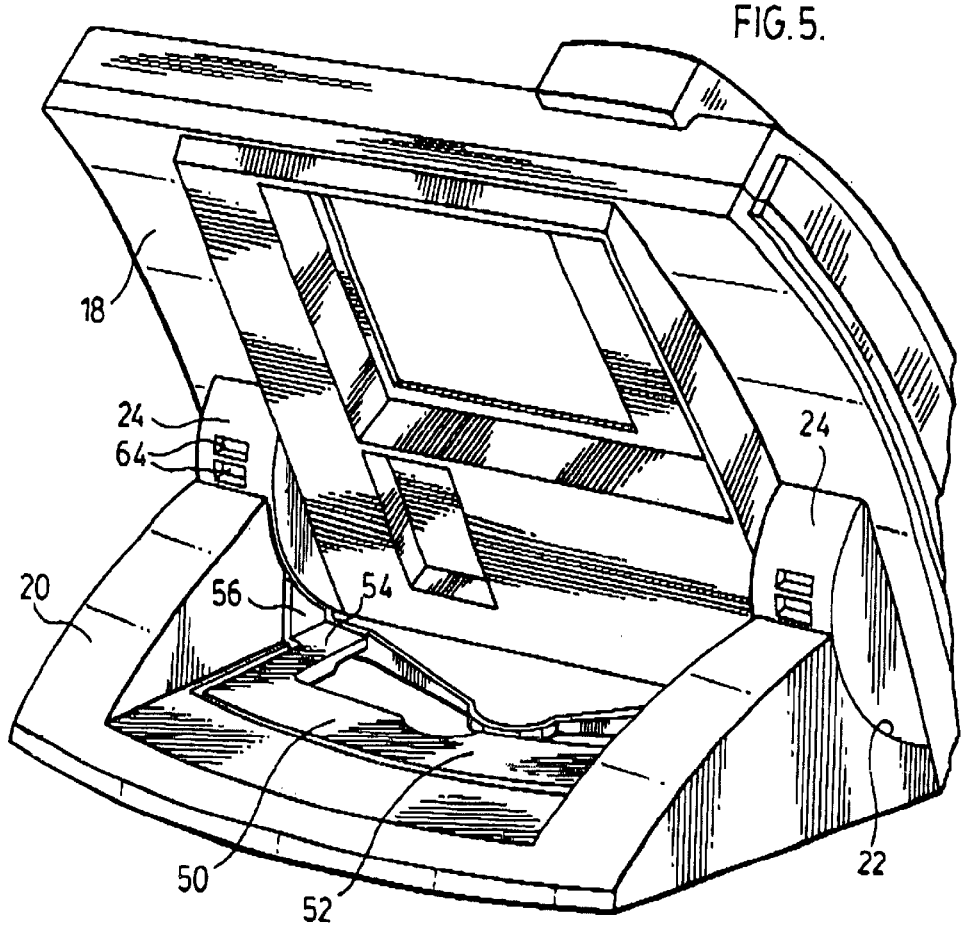
FIG. 5 is a perspective view of the telephone set of this invention, taken obliquely from the rear and showing the parts at maximum angulation.
Figure 6:
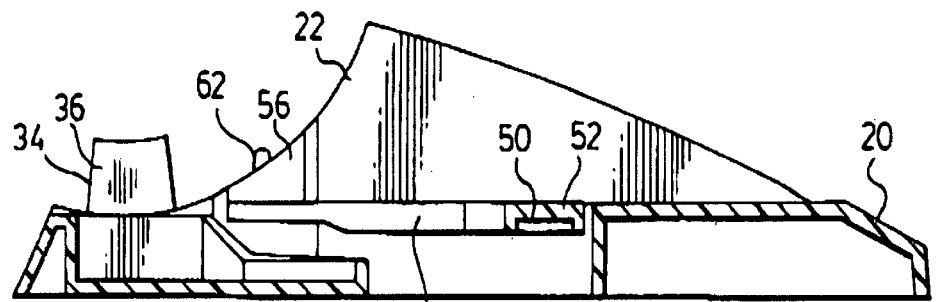
FIG. 6 is a vertical sectional view taken at the line 6—6 in FIG. 8, showing an activation lever in a condition corresponding to the locking of the two major components.
Figure 7:
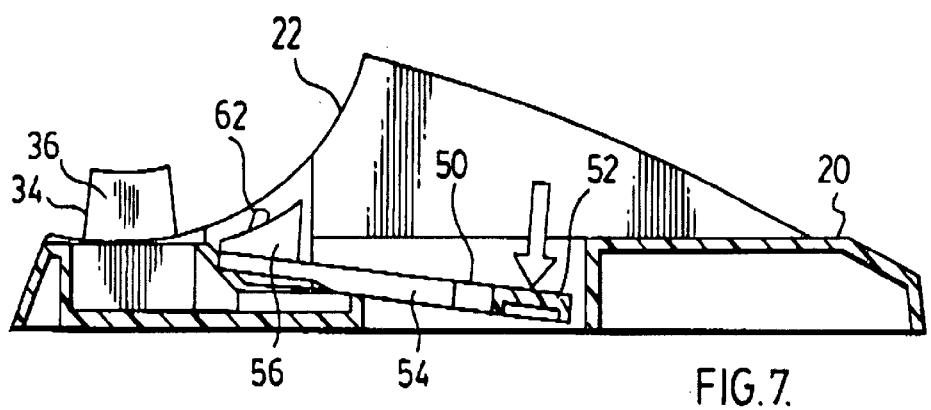
FIG. 7 is a view similar to FIG. 6, but with the activating lever depressed in order to allow relative rotation of the main components.

In order to ensure that the cylindrically curved portions 22 and 24 will remain in nested relationship, and not simply fall apart, retention means are provided for maintaining the portions 22 and 24 in nested relationship while permitting the telephone component to swing with respect to the base component. Such retention means, in the preferred embodiment illustrated, includes a slot 30 best seen in FIGS. 3 and 4, the slot 30 running circumferentially around a part of the cylindrical portion 24. The cylindrical portion 24 also includes an upstanding rib 32 along one side of the slot 30. The retention means further includes a first retainer tab 34 which has a wedge-shaped outer portion 36 and an undercut 38 sized and disposed such that the retainer tab 34 can be inserted through a wide end portion 40 of the slot 30, and engage or hook over the top of the rib 32. This is best seen in FIGS. 3 and 4.

A back-up retention means is provided for the cylindrically curved portions 22 and 24, involving a further slot 44 in the concavely curved portion 22 (see FIG. 3), along with a further retainer tab 46 affixed to the convex portion 24 on the telephone component 18. It will be understood that both of the retainer tabs 34 and 46 will simultaneously engage the respective slots, Thus, the telephone and base components in effect "snap" together by the simultaneous entry of the retainer tabs 34 and 46 into the respective slots 30 and 44. As seen particularly in FIG. 3, the convex and concave nesting portions 22 and 24 are defined at either end of the components 18 and 20, and are mirror images of each other.

The telephone set further includes locking means for releasably securing the two components 18 and 20 in any one of a plurality of mutual angulations. In the embodiment illustrated, FIGS. 3 and 8 show that the base component 20 incorporates a further-operable lever member 50 which has a transverse portion 52 which links two arm portions 54, each of which is integral with an upstanding, approximately triangular wall 56, which in turn is integral with an elongate portion 58 which (as best seen in FIG. 8) forms part of the concavely curved portion 22, described earlier. The elongate portion 58 has the same curvature as the remainder of the concave portion (which it largely defines), and terminates at an integral connection 60 with the remainder of the base component 20. Thus, the lever member 50, is in effect, cantilevered rearwardly from its connection at the location 60.

As best seen in FIG. 8, each of the elongate portions 58 supports a protuberance 62 which is rounded and transversely elongate. Looking at FIG. 3, it can be seen that when the concave and convex portions 22, 24 are nested together, the protuberance 62 will seek to enter one of the plurality of recesses 64. FIG. 4 shows the protuberance 62 lodged in one of the recesses 64. The lever member 50, including the transverse member 52, the arm members 54, the triangular portions 56 and the elongate portions 58 are sized to be resilient enough to permit downward pressure on the transverse member 52 (as applied by a finger 70 seen in FIG. 8) to cause the rearward part of the elongate portion 58 to move downward, thence rotating it about the connection location 60, thus withdrawing the protuberance 62 downwardly out of registry with the recesses 64. By holding down the transverse member 52 of the lever member 50, and thus maintaining the protuberance 62 below the recesses 64, it is possible to change the angulation between the components 18 and 20 to any one of a total of seven possible angulations (because there are seven recesses in the particular embodiment illustrated). When the desired angulation is reached, downward finger pressure on the transverse member 52 is halted, and the lever member 50 moves upwardly to is at-rest position, which is that which allows the protuberance 62 to enter one of the recesses 64.

It is thus seen that a mechanism has been developed which requires few plastic parts, thus providing additional value and functionality at no additional cost. It is also contemplated that the lowest (flat) position (that of FIG. 1) can be used for wall-mounting. This position is also advantageous for shipping the products in a compact form, thus minimizing the shipping volume costs.

While one embodiment of this invention has been illustrated in the accompanying drawings and described herein above, it will be evident to those skilled in the art that changes and modifications may be made therein, without departing from the essence of this invention, as set forth in the appended claims.

The embodiments of the invention in which an exclusive property or privilege is claimed are defined as follows:

1. The combination of a telephone component and a base component for supporting the telephone component at a plurality of angles with respect to a surface on which the base component is placed, one said component defining a concavely curved portion, the other said component defining a convexly curved portion adapted to nest within and be guided by said concavely curved portion such that, while the base component remains stationary, the telephone component can swing through a range of angulation with respect to said base component; retention means operatively associated with said curved portions for maintaining said portions in nested relationship while permitting said telephone component to swing with respect to the base component; and finger-operated release and locking means adapted to release the two components for mutual rotation upon the application of finger pressure, and to secure the two components in any one of a plurality of mutual angulations upon release of finger pressure.

2. The combination claimed in claim 1, in which both said curved portions are circularly curved, whereby there is defined a hypothetical axis about which said curved portions can mutually rotate, said axis being the center of curvature of said curved portions.

3. The combination claimed in claim 1, in which said portion of the base component is concavely curved, and said portion of the telephone component is convexly curved.

4. The combination claimed claim 1, in which the retention means comprises:

a slot extending circumferentially through one of said curved portions, a retainer tab secured to the other of said curved portions and projecting through said slot so as to achieve mechanical interference with an edge of said slot, such that, once inserted through the slot, the retainer tab resists any effort to separate said portions.

5. The combination claimed in claim 4, in which the slot has an expanded region, the retainer tab being flexible enough to allow it, once aligned with said expanded region, to be distorted away from said edge of the slot far enough to withdraw the tab from the slot.

6. The combination claimed in claim 1, in which the locking means comprises:

a protuberance on one of said curved portions, a plurality of recesses in the other of said curved portions, resilient means urging the protuberance toward engagement with a recess, thereby to achieve a locked relation between the two curved portions, and a finger-movable lever member operatively associated with the protuberance such that movement of the lever in one direction shifts the protuberance in the direction away from the recesses, while movement of the lever member in the opposite direction allows the resilient means to urge the protuberance toward the recesses.

7. The combination claimed in claim 6, in which the lever member includes a transverse member linked to an arm member which in turn connects with an elongate portion defining, remote from the transverse member, an extremity where the elongate portion is secured to the base component, the protuberance being integrally supported on said elongate portion such that movement of the lever member in said one direction bends said elongate portion in the direction which causes the protuberance to move away from the recesses.

8. The combination claimed in claim 7, in which said elongate portion in part defines the said concavely curved portion.

9. The combination claimed in claim 1, in which each component has two said curved portions located at opposed lateral extremities of the respective component, the two curved portions for each component being coaxial.

* * * * *